May 8, 1962  H. W. WELSH  3,033,520
ROTOR BLADE LOCK
Filed June 11, 1958

INVENTOR.
Harvey W. Welsh
BY Paul Fitzpatrick
ATTORNEY

United States Patent Office 3,033,520
Patented May 8, 1962

3,033,520
ROTOR BLADE LOCK
Harvey W. Welsh, Indianapolis, Ind., assignor to General Motors Corporation, Detroit, Mich., a corporation of Delaware
Filed June 11, 1958, Ser. No. 741,289
2 Claims. (Cl. 253—77)

My invention relates to blade locks for rotary machines, such, for example, as compressors and turbines. It is customary in such machines to mount a row of blades on the periphery of a disk or other rotor structure by sliding the roots of the blades into dovetail grooves extending more or less axially across a rim or flange on the rotor. Some arrangement must be provided to hold or lock the blades in place in the slots, and many arrangements for this purpose have been proposed.

My invention is directed to a blade lock which is particularly advantageous from the standpoints of positive retention of the blade, ease of application and removal of the lock, light weight, and simplicity of structure leading to manufacturing economies.

The principal objects of the invention are to improve the retention of blades on turbomachine rotors and to provide an improved blade lock for such machines.

The nature of the invention and the advantages thereof will be clear to those skilled in the art from the succeeding detailed description and drawings of the preferred embodiment of the invention.

Figure 1:
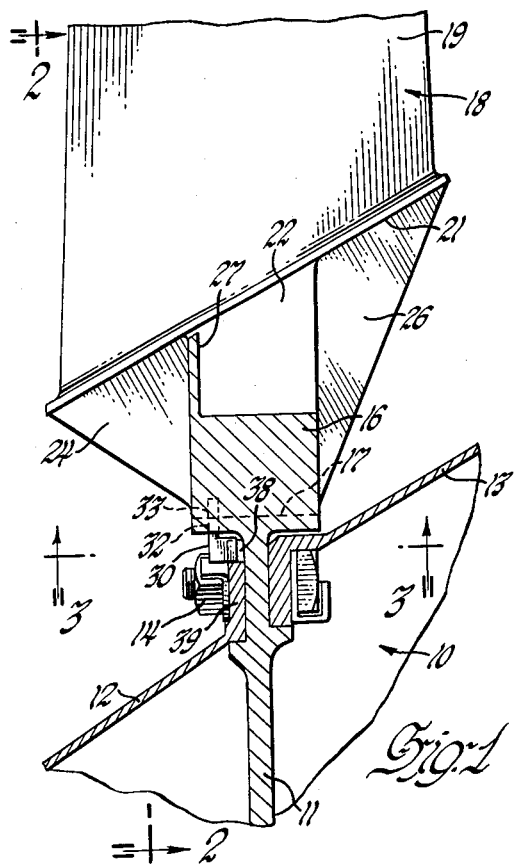
FIGURE 1 is a fragmentary sectional view of an axial flow compressor rotor taken on a plane containing the axis of the rotor.
Figure 2:
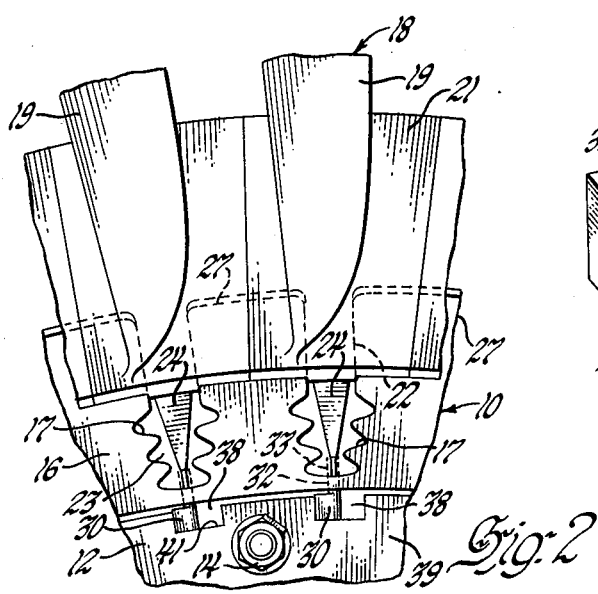
FIGURE 2 is a fragmentary front elevation view of the same taken on the plane indicated by the line 2—2 in FIGURE 1.

Referring first to FIGURES 1 and 2 for a description of an illustrative embodiment of the invention, a compressor rotor 10 comprises one or more disks 11, only one of which is shown. The disks may be connected by spacer rings such as 12 and 13 fixed to the disk 11 adjacent the rim thereof by bolts and nuts 14. The disk 11 has a relatively heavy rim or flange 16 in which are cut dovetail slots 17 extending across the rim of the wheel. These slots may be parallel to the axis or may be inclined or skewed with respect to the axis.

A number of rotor blades 18 are mounted on the rim 16 of disk 11. Each blade comprises an airfoil or blade portion 19, a blade platform 21, a stalk 22, and a root 23, the root being configured for mounting in the slot 17. The stalk connects the root to the platform and the airfoil extends outwardly from the platform. The platforms of adjacent blades abut to provide the inner boundary of the flow path through the rotor stage. Webs 24 and 26 extend from the forward and rear faces of the root and stalk to the blade platform. An interrupted air baffle flange 27 extends from the rim to close the spaces between the stalks 22. It will be understood that the rotor structure so far described is merely illustrative of one type of rotor structure to which the invention may be applied.

Figure 3:
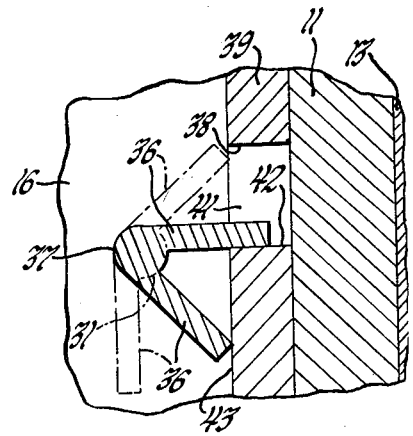
FIGURE 3 is a fragmentary sectional view taken on the plane indicated by the line 3—3 in FIGURE 1.
Figure 4:
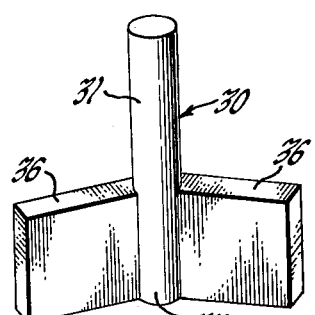
FIGURE 4 is an axonometric view of a blade locking pin.

The invention is particularly concerned with the blade locking means which comprises a pin 30, best shown in FIGURE 4 as it appears before it is secured in place. The pin 30 comprises a body 31 which is inserted through a hole 32 extending through the rim 16 and communicating with the blade mounting slot 17. The root of the blade is formed with a hole or slot 33, which may be referred to as an opening, which receives the end of the pin body 31. With the pin in place engaging both the wheel rim and the blade root, the blade is locked against movement out of the slot. To retain the pin against sliding out of the hole 32 and opening 33, it is provided with two bendable tabs 36 extending laterally from the head portion 37 of the body 31, which remains outside the hole 32 when the pin is in place. Preferably the tabs 36 are disposed at about a 135° angle to each other in the pin as it is manufactured, as shown in FIGURE 4 and by the broken lines in FIGURE 3. A recess 38 is provided in the rotor adjacent the head of each pin which cooperates with the tabs 36 to hold the pin in place. As illustrated, these recesses 38 are cut into the flange portion 39 of the spacer ring 12. The recess is bounded by an outwardly facing surface 41 providing a shoulder and a radial surface 42 providing an abutment.

The pin in the fabricated form is inserted into the hole 32 and opening 33, in which it is a somewhat loose fit so it may be easily inserted and removed. The tabs 36 are then bent together as illustrated by the solid lines in FIGURE 3 so that one of the tabs engages the radial face or abutment 42 of the recess 38 and the other engages the forward face 43 of flange 39. The tab which extends into the recess 38 holds the pin against dropping out of the hole by engagement with the radially facing surface or abutment 41 of the recess. The engagement of the tabs with surface 42 and the face 43 of the spacer ring holds one of the tabs in the recess 38.

The way in which the blade is inserted and the locking pin 30 is inserted and fixed against removal will be apparent from the foregoing. To release the blade, it is necessary only to spread the tabs apart so the pin can be removed. There is no great force tending to remove the pin from the hole and, in fact, centrifugal force will hold it in place when the compressor is operating.

It will be apparent that the blade lock is light, simple, inexpensive, easy to apply and remove, and is of very small weight, characteristics which make it highly suitable for the purpose described in compressors or analogous machines.

The detailed description of the preferred embodiment of the invention for the purpose of explaining the principles thereof is not to be considered as limiting or restricting the invention, since many modifications may be made by the exercise of skill in the art within the scope of the invention.

I claim:

1. A rotor assembly for a turbomachine comprising, in combination, a rotor having a blade receiving slot in the periphery thereof; a blade having a root slidably mounted in the slot, the root and slot having cooperating dovetail shoulders; the rotor having a hole therethrough intersecting the slot and the blade root having an opening therein aligned with the hole in the normal mounted position of the blade; and means for locking the blade in the slot comprising a pin extending through the hole into the opening, the pin having a portion outside of the hole and opening with two bendable tabs extending laterally therefrom; the rotor having a face with a recess therein, the recess defining a shoulder facing the hole and an abutment, and the tabs being bent to engage one tab in the recess against the abutment overlying the shoulder and the other tab against the face.

2. A rotor assembly for a turbomachine comprising, in combination, a rotor having a blade receiving slot in the periphery thereof; a blade having a root slidably mounted in the slot, the root and slot having cooperating dovetail shoulders; the rotor having a hole extending radially of the rotor therethrough intersecting the slot and the blade root having an opening therein aligned with the hole in the normal mounted position of the blade; and means for locking the blade in the slot comprising a pin extending through the hole into the opening, the pin having a portion outside of the hole and opening with two bendable tabs extending laterally therefrom; the rotor having a face with a recess therein, the recess defining a radially facing shoulder and a radial abutment, and the tabs being bent to engage one tab in the recess against the abutment overlying the shoulder and the other tab against the face.

References Cited in the file of this patent

FOREIGN PATENTS

| | | |
|---|---|---|
| 643,914 | Great Britain | Sept. 27, 1950 |
| 691,380 | Great Britain | May 13, 1953 |
| 889,160 | Germany | Sept. 7, 1953 |
| 1,062,938 | France | Dec. 9, 1953 |